United States Patent [19]

Washburn

[11] 4,044,281

[45] Aug. 23, 1977

[54] HIGH VOLTAGE GLOW DISCHARGE POWER SOURCE

[75] Inventor: Robert D. Washburn, Malibu, Calif.

[73] Assignee: Hughes Aircraft Company, Culver City, Calif.

[21] Appl. No.: 678,522

[22] Filed: Apr. 20, 1976

[51] Int. Cl.² .............................................. H01S 3/02
[52] U.S. Cl. ................................. 315/171; 315/167; 315/176; 315/300; 315/337; 330/4.3; 331/94.5 D; 331/94.5 PE
[58] Field of Search ............... 315/160, 167, 291, 299, 315/300, 301, 307, 334, 337, 171, 175, 176; 331/94.5 R, 94.5 M, 94.5 PE, 94.5 D; 330/4.3; 332/7.51

[56] References Cited

U.S. PATENT DOCUMENTS 3,868,593  2/1975  Fukuda et al. ............... 331/94.5 D

*Primary Examiner*—Eugene R. LaRoche
*Attorney, Agent, or Firm*—Martin E. Gerry; William H. MacAllister, Jr.

[57] ABSTRACT

A high voltage glow discharge power source providing a plurality of glow discharges by gas ignition within at least one elongated electrically insulating member having a central bore along the axis of elongation of the member. Electrodes are positioned along the outer surface along the length of the member to which current sources and sinks are connected in alternation. A DC power supply provides the energy for the current sources and sinks. End plates covering the bore are transparent to optical frequencies. Glow discharges occur within the bore so that when a laser generator beam is diverted into the bore through the end plates, the gas in the bore being ignited to provide the glow, discharges and effects a power gain in the laser signal at the other end of the bore.

10 Claims, 8 Drawing Figures

4,044,281

HIGH VOLTAGE GLOW DISCHARGE POWER SOURCE

BACKGROUND OF THE INVENTION

This invention relates to a high voltage power source used to provide power to high frequency electronic circuits or systems, and particularly to laser amplifiers providing high power gain.

The traditional method of generating a gas discharge is simply to place a current limiting ballast resistor in series with the gas tube and then apply a large voltage across the combination of gas tube and ballast resistor.

For laser amplifier use it is desired to form a continuous uniform discharge over a one meter predetermined length of a gas discharge tube having a confined gas therein. The necessary driving voltage in prior art discharge devices becomes enormous; in the order of 375 kv. However, the single discharge can be broken into several shorter lower voltage discharge paths, but such shorter lower voltage discharge paths entails the use of independent isolated voltage sources. For a practical system the costs for more than two sections of such shorter lower voltage discharge paths becomes economically prohibitive.

Another prior art alternative is the use of additional ballast resistors to stabilize the discharge from a single voltage source. However, such method necessarily results in dead spaces between discharge elements. With dead spaces between anodes and/or cathodes, there is no assurance that a discharge current will ignite between adjacent discharge branches in the prior art discharge methods. Although straight-forward in concept, such prior art method does not meet the requirements to eliminate the dead spaces.

Furthermore, additional disadvantages of the prior art is that discharges occurring in the low current region reveals that ordinary ballast circuits using resistors become unstable when the discharges operate in such low current regions.

SUMMARY OF THE INVENTION

A laser amplifier discharge power supply or supplies is disclosed which provides a degree of sophistication beyond the capabilities of any commercially available high voltage supply. As with a waveguide oscillator, a high degree of gas discharge stability is necessary for the proper operation of amplifier portions which are integral with the power supply portions. Requirements for increased gain, elimination of parasitic oscillations, flexibility in parameter selection, and operator safety define the baselines for design of the inventive power source. Accordingly, the following considerations are necessary for providing the requisite power supply of the invention.

One objective is elimination of dead spaces in a waveguide amplifier in which the glow discharge power source is an integral part, to prevent gas discontinuity that would otherwise cause lensing effects (refractive index changes) and parasitic oscillations.

Another objective is to obtain a higher gain at low discharge currents, for example, currents of less than 1 milliampere, particularly at the higher gas pressures utilized. Consequently current regulated power supplies are utilized in accordance with the invention to maintain a discharge at these current levels and gas pressures.

Still another objective is to increase operator and operational safety by providing high voltage protection techniques. These features are provided in accordance with the principles of the invention by power supplies having floating outputs with respect to ground.

Though there is very little empirical data concerning the correlation of discharge instability or noise and waveguide amplifier amplitude or noise, it has been demonstrated by actual testing that discharge current fluctuations cause frequency fluctuations in waveguide oscillators. Similar effects could be expected in a long waveguide amplifier where micro or nanoampere current fluctuations may modulate the output over a very wide and intolerable range.

As a result of the achieved objectives, reduction of amplifier injected noise will decrease the closed loop error correction requirements for the supply and for the system operated by it.

The power supply design of the invention permits a large range of discharge currents to be selected. The ability to vary the discharge current in different segments of the amplifier therefore allows optimization of overall amplifier performance.

One power supply in accordance with the concepts of the invention powering a waveguide amplifier includes single element cathode configuration to eliminate dead zones in the amplifier. This power supply also includes anode current limiters to insure that all segments turn on at all times. Cathode current regulators are also used to permit low current operation, and optional provisions for the use of plasma cathodes to minimize discharge current noise is possible.

A major requirement for a satisfactory glow discharge tube which avoids disadvantages of the prior art, is that current sources and current sink circuits be provided to electrodes connected in alternation through which glow discharges are conducted which requirement is accomplished by the instant invention.

DETAILED DESCRIPTION

Figure 1:
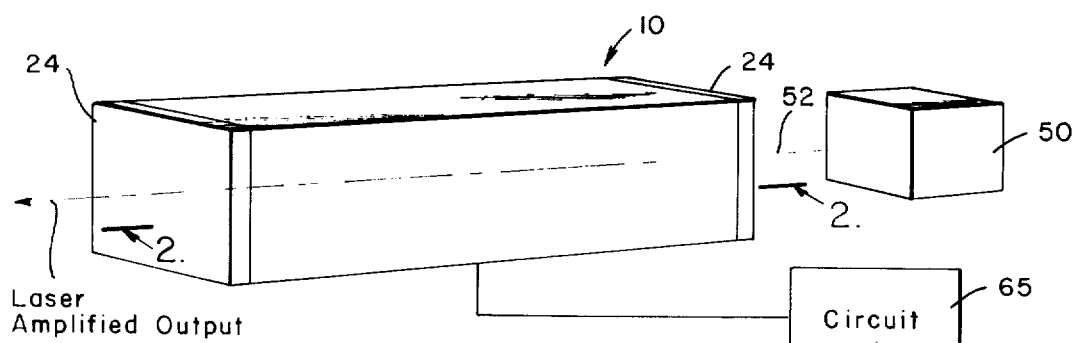
FIG. 1 is a perspective view of the inventive glow discharge power supply herein shown as used in conjunction with a laser generator source to amplify the power output from the laser generator.
Figure 2:
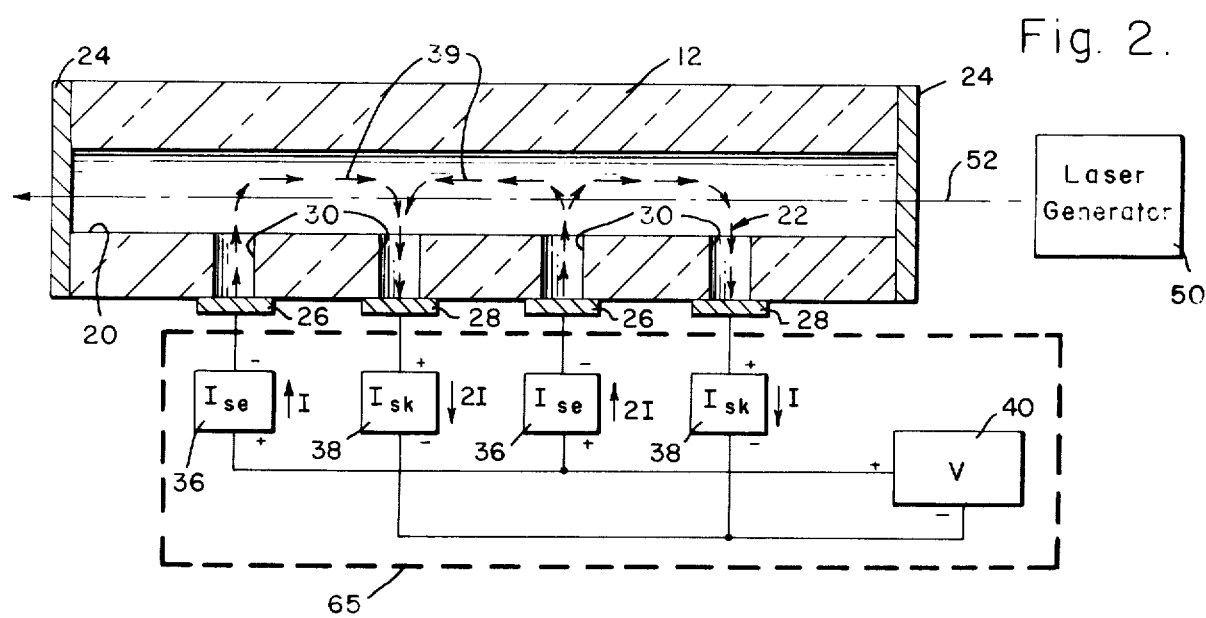
FIG. 2 is a view taken at plane 2—2 of FIG. 1 to show the cross-section view of the glow discharge tube.

Referring first to FIGS. 1 and 2, a glow discharge tube 10 is shown which as an illustrative example may be about 1 meter long and made of ceramic high electrical insulating material, such as a berylium oxide which has a 1600° C melting point.

The tube 10 has walls 12 and a capillary 20 extending through a central axis along the length of the tube. End plates are provided at 24 for blocking capillary 20 so as to enable sealing in of gas in capillary, but also acting as windows for laser wavelengths in any desired range such as a range of 0.3–14 microns. These end plates may be made of zinc selenide since this type of material acts as window for such laser frequencies. Electrodes 26 are provided alternating with electrodes 28 and spaced along the outer surface of tube 10, so that current sources as at 36 may be connected to electrodes 26 and current sinks 38 may be connected to electrodes 28.

The current sources 36 have their negative terminals connected to anodes or electrodes at 26, and their positive terminals connected to positive potential output terminal of a high voltage DC power supply 40. Current sinks 38 have their positive terminals connected to cathodes or electrodes 28, and their negative terminals connected to the negative potential output terminal of the high voltage DC power supply 40.

High voltage DC power supply 40 is adjustable in the illustrated system over a range of 0 to 70 kv and has a current capacity range from 0 currents to 225 milliampers under full load operation. A power supply having these characteristics is made by Universal Voltronics of Mount Kisco, N.Y., details of which are shown in their instruction manual for Model BAL-70-225-H. Supply 40, current sources 36 and current sinks 38 are shown as circuit at 65.

Referring only to FIG. 2, the cross-section view of the glow discharge tube enables us to see the structure of a plurality of apertures extending from the capillary radially outward to the surface of the capillary tube at its wall 12 so that electrodes consisting of anodes 26 and cathodes 28 block such apertures 30 which may be round, or any other shape. Glow discharges may generally be seen at 22 comprising a plurality of glow discharge paths. Each path identified at 39 is approximately 10 centimeters long. As can be seen, such glow discharge paths in capillary 20 will be created due to action of current sources and current sinks 36 and 38 respectively, which sources and sinks are powered by DC power supply 40. It is to be noted that glow discharge current paths (+ to −) between adjacent interelectrode spaces are in opposite directions.

The current flow through the current source will be as shown by arrows at I and 2I for the two current sources shown in this figure and the current through the current sinks 38 will be shown at arrows 2I and I for each of the two current sinks in question. The reason for twice the current in one of the current sources and twice the current in one of the current sinks is that the particular glow discharge paths being fed by these sources and sinks respectively are twice the paths compared with one having half the level of current indicated.

Consequently viewing FIG. 2 from left to right it can be seen that current flow through the first current source upward through electrode 26 through aperture 30 and the first glow discharge path will be created by virtue of the next adjacent aperture 30 and its electrode 28, with current flowing downward through the current sink 38 and returning to power supply 40. At the same time the next adjacent current source 36 having twice the amount of current through the source, such current will flow through electrode 26 through aperture 30 and ignite the gas in capillary 20 and create another pair of glow discharge paths, one path directed to the left and to the next adjacent aperature 30 and the other to the right to its next adjacent aperature 30, in both instances to flow into current sinks 38, and the current from both of these to be returned to a negative terminal of power supply 40. Of course power supply 40 will provide power at positive potential to both current sources.

It can therefore be seen that because of the arrangement of the current sources and sinks and their corresponding electrodes the gas will be ignited in capillary 20 to provide almost simultaneously a group of discharge paths of short length, namely about 10 centimeters, which unlike the prior art, will all provide current flowing through the various circuits, and current sources and sinks, to completely fill up the capillary tube with electrons due to ionization of the gas within capillary tube 20.

With respect to the cross-section area of the capillary, a variety of different areas may be used, but experimentally one area of 1 square millimeter was found to be satisfactory. Gases within capillary tube 20 which may be used in the amplifier are carbon dioxide 13% by volume, nitrogen 22% by volume and helium 65% by volume, but it is to be understood that other suitable gases and mixtures of gases may be utilized within the scope of the invention.

In view of the ignition of several gases within capillary 20, and in view that of the fact that the plurality of glow discharge paths instantaneously fill the entire capillary tube, it should be appreciated that if a laser generator at 50 is placed so that its light output is directed through window 24 into capillary tube 20, laser beam 52 will be propagated through capillary of tube 20 and exit at the other end of the capillary tube though a like window 24 at a very substantially increased power level. Such increased power level is a function of glow discharge tube overall length. The transfer of energy to the laser beam is caused by the electrons in the gas combining with the laser beam, as is well known in the art. For example, a glow discharge tube of effective length of about 4 meters will provide about a 100 watts laser output for 1 watt input. The example is calculated for a particular voltage supplied from the DC source and a particular current through the sources and sinks for constant gas pressure and irrespective of the laser wavelength as long as such wavelength is in the range 0.3–14 microns. The estimated performance characteristic of glow discharge tube length as a function of power output is approximated by the curve shown in FIG. 8.

Figure 3:
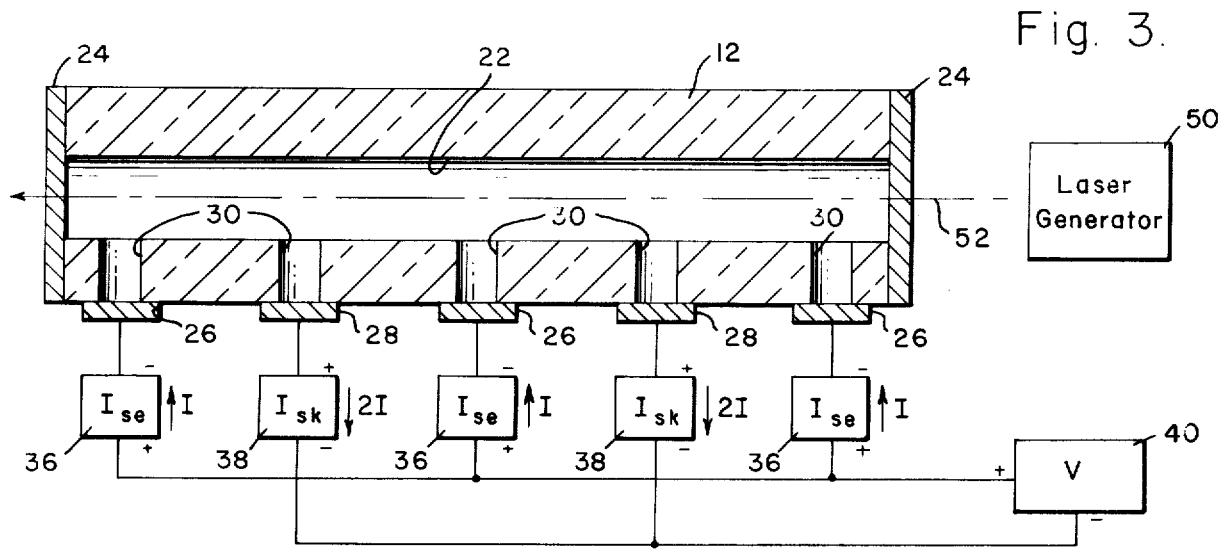
FIG. 3 is a cross-section view similar to that of FIG. 2 except that sufficient current sources and current sinks have been used to obtain a balanced current flow in the several circuits and consequently more uniform energy distribution is obtained in the various glow discharge paths.

Referring to FIG. 3 it may be seen that this figure is substantially the same as the system described in FIG. 2 except that an additional current source has been provided. This additional current source enables a more balanced distribution of currents flowing through the several current sources and current sinks.

Figure 4:
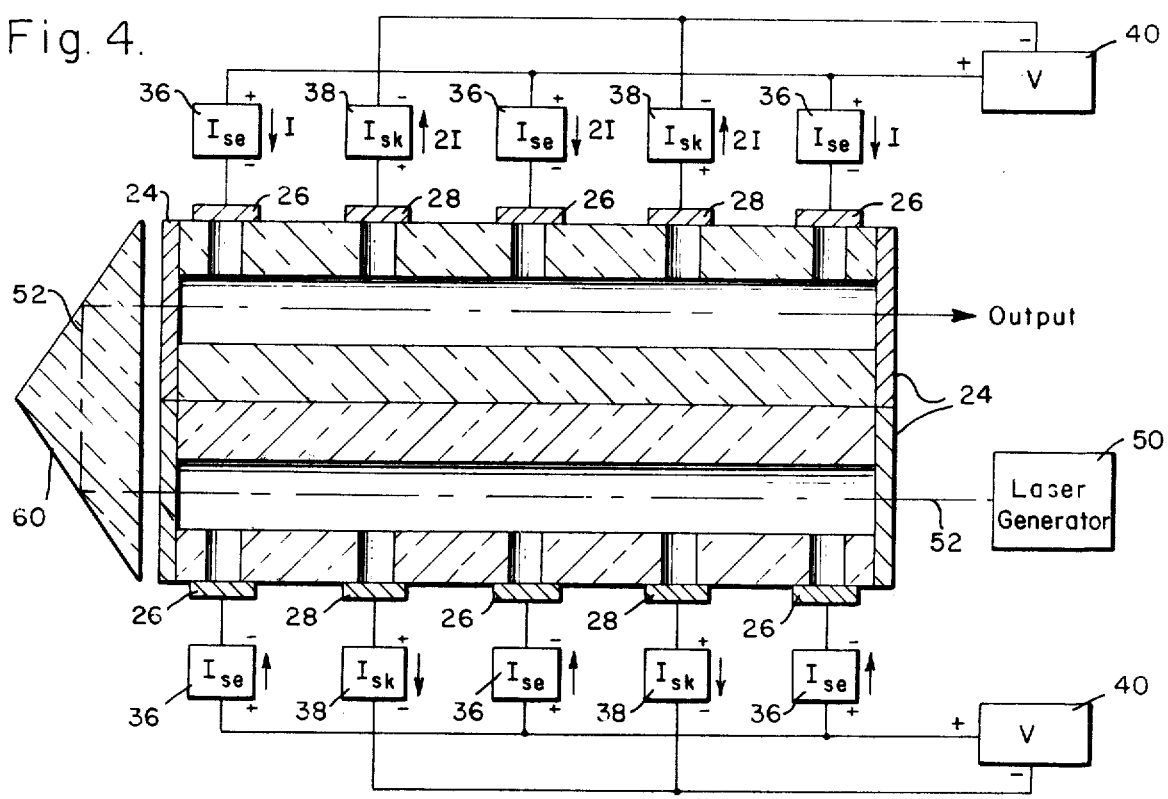
FIG. 4 is a cross-section view similar to that of FIG. 3 showing the use of a plurality of glow discharge tubes to comprise the glow discharge power supply.

Referring to FIG. 4 it may be seen that a system involving two glow discharge tubes side by side with circuitry the same as FIG. 3 may be utilized. Each glow discharge tube requires its own power supply 40 and its own set of current sources 36 and current sinks 38. It also requires its own electrodes or anodes 26 and cathodes 28 respectively, and each one of the discharge tubes behaves in identical manner as described in connection with FIGS. 2 and 3 insofar as generating the glow discharges within each tube. However, in this case a device to bend the output beam, provided by laser generator 50 at the input of one of these tubes and exiting from the other end thereof, can generally consist of a prism as at 60, or any suitable light turning or directing arrangement, which will direct light beam 52 so as to cause that light beam to enter through window 24 of the other glow discharge tube and exit at the other end of said other glow discharge tube as an amplified power output compared to the power output of the laser generator. As can be appreciated, many of these smaller glow discharge tubes may be stacked in like manner as just described to provide almost any length of effective glow discharge tube desired. For example, if two additional sets of tubes were stacked on top of the two illustrated in FIG. 4 and those two were coupled to the other two by means of prisms such as at 60, the effective length of the overall discharge tube previously discussed would be about 4 meters, and as such the 1 watt output of the laser generator would be amplified to provide approximately 100 watts output from the system.

Figure 5:
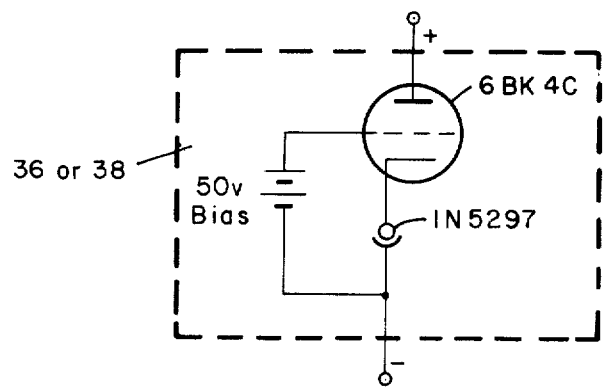
FIG. 5 is a schematic of either the current sources or current sinks as used in this invention.

Referring now to FIG. 5 a schematic of one illustrative type of circuit that may used either as a current source 36 or as a current sink 38 is shown. A 6BK4C vacuum tube is used to connect its cathode to the anode of a diode or gas diode such as type 1N5297, the cathode of such diode being the negative terminal of this circuit. Positive bias is applied to the grid of the tube generated by the use of a 50 volt source such as a battery so that the grid is positive at 50 volts with respect to the cathode of the diode. When used in any of the circuits comprising FIGS. 1-4, this current source or sink is connected in accordance with the polarity shown at the terminals of FIG. 5, so that such polarities correspond with the polarities of the current sources and current sinks in the schematics shown in FIGS. 1-4. It is to be noted that other suitable sources and sinks having similar characteristics may be utilized within the scope of the invention.

Figure 6:
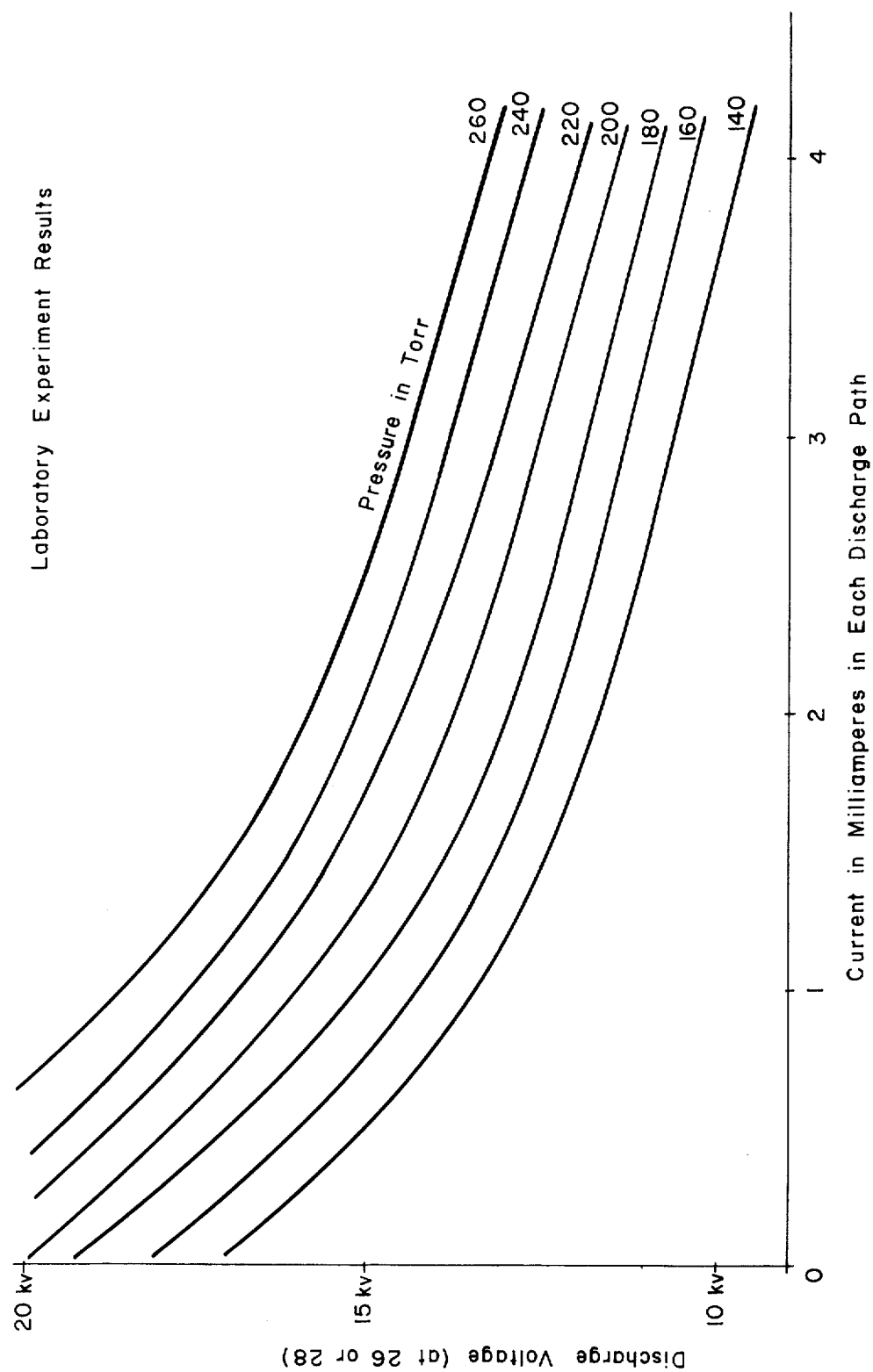
FIG. 6 comprises results from experiments conducted in order to obtain a constant pressure family of curves for various discharge voltages applied versus currents in milliamperes obtained in the discharge paths.

FIG. 6 shows laboratory results obtained under conditions where the discharge path length for each individual anode to cathode path was designed to approximately 10 centimeters, using a capillary size of 1 millimeter square diameter and having the gases within capillary 20 as indicated above. A family of constant pressure curves in Torrs are shown for discharge voltages across current anodes and cathodes 26 and 28 versus the current in milliamperes for each discharge path such as path 39 shown in FIG. 2.

Figure 7:
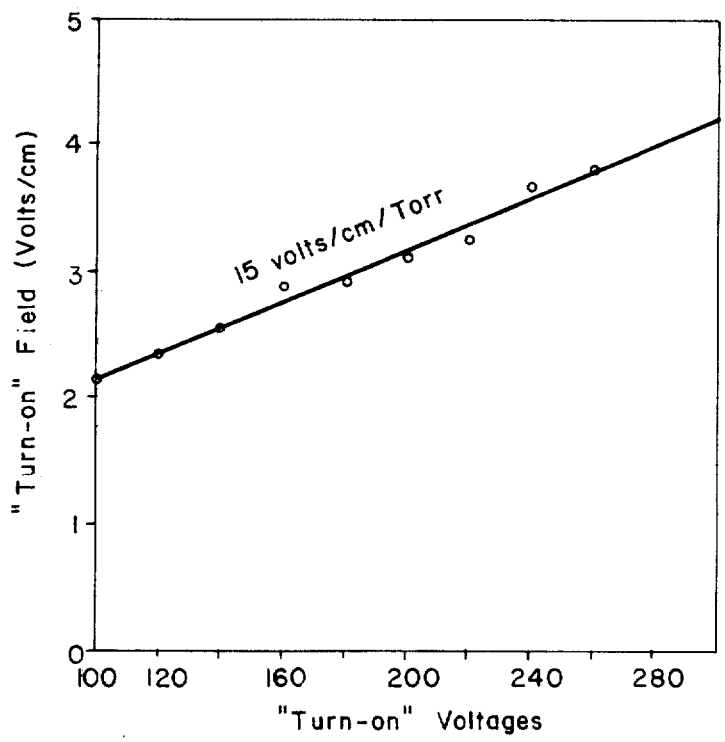
FIG. 7 shows a linear relationship for the turn on fields as supplied by an external power source to the inventive circuit versus pressure in Torrs.

Referring to FIG. 7 an exemplary condition of a constant voltage of 15 volts per centimeter per Torr is shown in a curve for the turn-on field in terms of volts per centimeter as a function of pressure in Torr. The turn-on field is that electric field produced between adjacent anodes 26 and cathodes 28.

Referring to FIGS. 1, 2, 3 and 4, it is pointed out that the inadequacy of the prior art using ballast resistors led to the consideration in this invention for the use of current sources and current sink circuits to achieve requirements for this high voltage glow discharge power source at much lower DC voltage input levels, as provided by voltage source 40. Two major requirements were met. The voltage across two adjacent electrodes was set somewhat greater than that required to initiate any discharge paths, and after initiating the discharge the dynamic impedance of the discharge and control circuits had to be positive. The dynamic impedance is the impedance looking into the current source and sinks during operative mode of the glow discharge power source. To obtain the high dynamic impedance, a constant current source and/or sink was used. A high dynamic impedance means that the change in current for a change in voltage approaches zero. The terms source and sink refer to the injection and removal of current from a current node. Ideally, such a device has an infinite impedance while being able to pass large currents at essentially zero voltage. The constant current sources 36 or sinks 38 are devices that sense the current flowing through series path elements whether these elements be semiconductors, gaseous masses which are ignited, plasma or vacuum devices, and serve to maintain constant current independent of the voltage applied across any of these sources or sinks. Such sources or sinks can be constructed with dynamic impedances of 100 megohms at say 1 KHz. These sources and sinks utilized in the several views of the invention are active circuits that can meet dynamic impedance requirement as above stated with voltage drops much smaller than with a conventional ballast resistor.

Sources 36, as well as sinks 38, are constant current regulators. As current regulators they maintain constant current through them during the time they are operative (conducting). Consequently, the voltage across these sources and sinks will vary between non-conducting and conducting periods thereof, and such variation in voltages will be seen as voltage variations across the DC power supply that supplies power to the system. Such sources are in general series path type circuits and have some minimum operating or compliance voltage, below which the current decreases with decreasing voltage as a current through a non-linear resistor might. Initially, current sources 36 are nonconducting, and there is sufficient voltage to initiate a discharge. However in practice because of small pressure, temperature, or path length variations, one discharge path will start first at a slightly lower voltage than the other. If discharge in one path is the one that breaks down the gas in the capillary first, current begins to flow in that current source and continues to flow until it reaches the current limit point where the voltage across that source can continue to increase with no increase in the current. At the same time, the adjacent current source whose current limit is set at about twice the current limit level of the first current source has reduced the voltage drop between adjacent electrodes to which the current sources are connected, further inhibiting the start of discharge of the second discharge path, by occurring half way out on its voltage-current characteristic curve. However, increasing the supply voltage 40 will not further change the voltage level at the electrode of the second current source. By increasing the power supply voltage, the second discharge path can be initiated while the first discharge path is being maintained. When the gas in the area of the second discharge path ignites, the current in the second current source increases and it too reaches a limit level where the excess potential required for ignition now appears at the positive terminal of power supply 40. This in brief is the basic theory behind the starting capability for almost equal and instantaneous discharge paths created by this invention through utilization of constant current sources and sinks.

Figure 8:
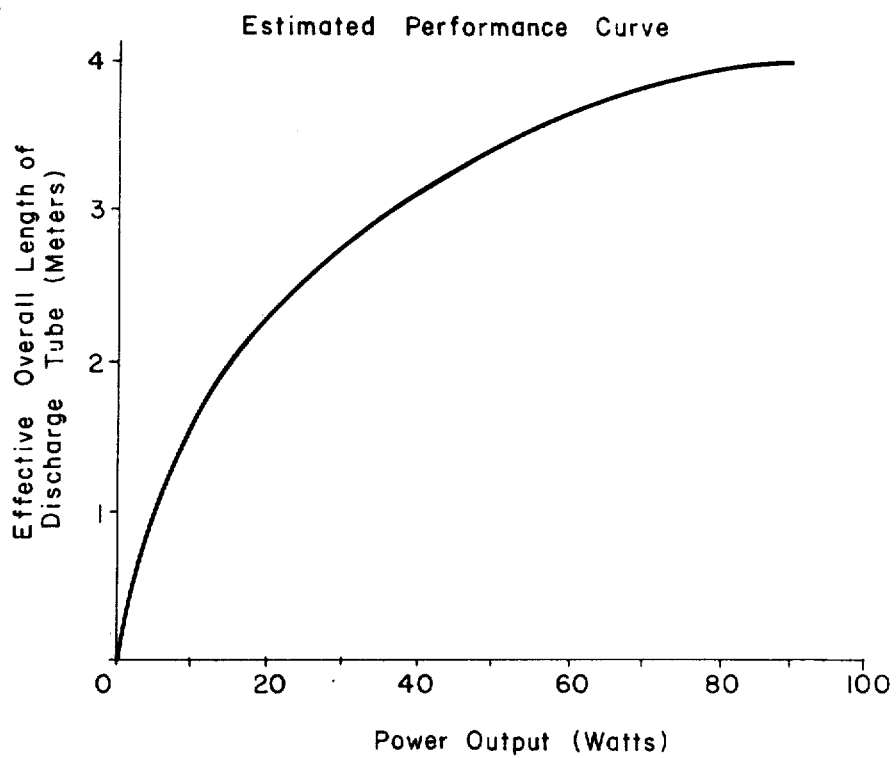
FIG. 8 is an estimated performance curve for amplification obtained in accordance with the principles of the invention the use of the glow discharge power source in conjunction with a laser generator showing the relationship between the overall length of the glow discharge tube or tubes versus the power output in watts.

Referring to FIG. 8, it may be seen that the estimated performance curve for creating an increased power output, or amplification of laser power may be accomplished by the use of the inventive glow discharge power system. As such a power system as illustrated in FIG. 4 will probably yield about a 20 watt output for a 1 watt input from laser generator 50. However, FIG. 8 also shows that when this system is doubled in the number of elements mainly by having four capillary tubes optically coupled to each other by means of beam splitters (or mirrors) such as shown in FIG. 4, that for the same power input into the first glow discharge tube of 1 watt, a power output from the fourth glow discharge tube of about a 100 watts may be expected.

It is again pointed out that in this instance the glow discharge power supply is acting very much similar to that of a vacuum tube amplifier. The analogy being that the glow discharge paths fill the entire capillary volume with electrons in motion and the laser beam accumulates such electrons when passing through the capillary, so that a larger mass of electrons exit the glow discharge tube or tubes thereby amplifying the initial power provided by the laser generator.

It may also be stated that current sources and sinks are required to obtain stable discharge paths within capillary glow discharge tubes. This is so because a high positive dynamic impedance when looking into the sink circuit at its positive terminal and at the output of the source at its negative terminal is provided by the sources and sinks, which is not practical of accomplishment using ballast resistors as in conventional art. The reason is that when using ballast resistors the current would decrease so that a tremendous increase in voltage would be required by supply voltage 40, where an increase in DC applied voltage would be substantially greater than used in the inventive system.

Again, referring to FIG. 2, the multiple discharge paths in capillary tube 10 provide the electrical pumping of the laser gas in the capillary tube. Plates at 24 at either side of the tube such as those made of zinc selenide, prevent the gas within the capillary from escaping, but act as windows for permitting wavelengths in the range of 0.3 to 14 microns pass therethrough as from a laser generator at 50. The current sources 36 connected to their respective anodes 26, and the current sinks 38 connected to their respective cathodes 28, wherein the anodes and cathodes alternate, serve to provide discharge paths within capillary 20 through aperture 30, and cumulatively provide the means for filling up capillary 20 and ionizing the gas therein with discharges as at 22 or 39 in a uniform manner and devoid of dead spaces in vicinity of apertures 30 inside the capillary internal surface.

One of the highlights of this invention therefore is utilizing in alternate connection of current sources to anodes with current sinks to cathodes.

What is claimed is:

1. In a glow discharge power source, the combination comprising:
    at least one elongated electronically insulating member having a bore therethrough, said bore retaining a gaseous mixture therein;
    electrodes positioned at predetermined locations of and attached to the outer surface of the member; and
    active electronic current sources and sinks connected in alternation to said electrodes.

2. The invention as stated in claim 1, wherein said member has apertures extending from the bore to the electrodes.

3. The invention as stated in claim 1, wherein the gaseous mixture comprises carbon dioxide, nitrogen and helium.

4. The invention as stated in claim 1, including at least one DC power supply connected to the current sources and sinks.

5. The invention as stated in claim 1, said at least one elongated member being a plurality of said members, and a beam director, optically coupled to said members, the beam director being positioned adjacent the plates of a contiguous pair of said members.

6. The invention as stated in claim 5, including a DC power supply for each said members feeding their respective current sources and sinks.

7. The invention as stated in claim 1, including a plate at each of two locations of the member blocking said bore, said plate being transparent to optical wavelengths.

8. The invention as stated in claim 3, including a laser generator optically coupled to one of the plates.

9. The invention as stated in claim 8, wherein said power source provides glow discharges within said bore between said electrodes.

10. The invention as stated in claim 9, wherein said glow discharges enhances power amplification of the output power of said laser generator.

* * * * *